R. F. HOMMEL.
TWO-IN-ONE LEVEL.
APPLICATION FILED MAY 23, 1914. RENEWED AUG. 30, 1916.

1,204,768.

Patented Nov. 14, 1916.

WITNESSES:

INVENTOR
Richard F. Hommel,
BY G. H. Strong
ATTORNEY

UNITED STATES PATENT OFFICE.

RICHARD F. HOMMEL, OF SAN FRANCISCO, CALIFORNIA.

TWO-IN-ONE LEVEL.

1,204,768.  Specification of Letters Patent.  Patented Nov. 14, 1916.

Application filed May 23, 1914, Serial No. 840,577.  Renewed August 30, 1916.  Serial No. 117,963.

*To all whom it may concern:*

Be it known that I, RICHARD F. HOMMEL, a citizen of the United States, residing in the city and county of San Francisco and State of California, have invented new and useful Improvements in Two-in-One Levels, of which the following is a specification.

This invention relates to an instrument for determining the plane of the horizon or a line perpendicular thereto.

In manufacturing bricklayers', carpenters' or like levels it is common practice to employ separately adjusted and independent spirit level glasses or tubes, one to secure the horizontal level and the other for the perpendicular. Separate frames for securing the glasses and adjusting same are therefore necessary.

It is one of the objects of the present invention to provide a single glass or tube with a right angular extension formed thereon, which may be mounted and adjusted in a single frame and by which both horizontal and perpendicular lines may be determined. The cost of manufacture and the time consumed in assembling may thus be considerably reduced and a compact structure is at the same time secured.

Another object of the invention is to provide means for conveying or leading the air bubble from the horizontal side of the glass tube to the perpendicular lining side.

The invention consists of the parts and the construction and combination of parts as hereinafter more fully described and claimed, having reference to the accompanying drawings, in which—

Figure 1:
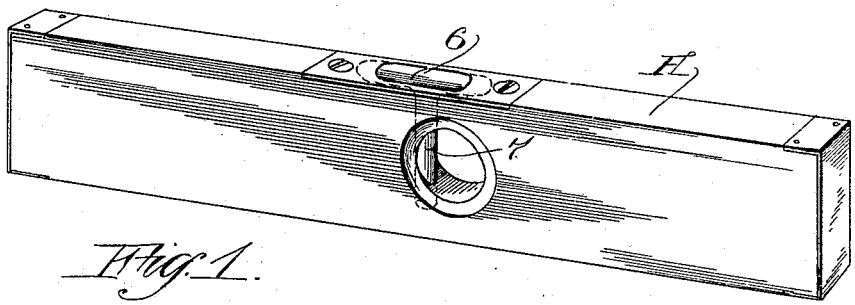
Figure 2:
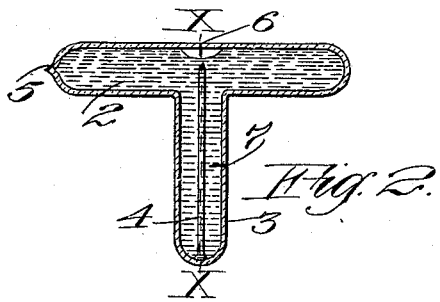
Figure 3:
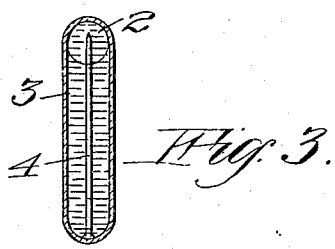

Figure 1 is a perspective view of an ordinary carpenter's plumb and level, showing the application of the invention. Fig. 2 is a detail view of the spirit level in side elevation. Fig. 3 is a cross section on line X—X, Fig. 2.

Referring to the drawings, A indicates an ordinary carpenter's plumb and level to which the spirit level forming the subject-matter of the present application is applied. The spirit level, shown in detail in Figs. 2 and 3, consists of a horizontally positioned glass tube 2, on the lower side of which is formed, at right angles, a tubular extension 3. Suitably secured in the lower end of said extension, and extending up into the horizontally positioned tube, is a centrally positioned rod 4.

The glass tube constructed as here shown is nearly filled with anhydrous ether or a mixture of ether and alcohol. The tube is then sealed up, as at 5, in the usual manner. It is then secured in a frame of suitable construction (not here shown) by which it may be adjusted within the stock of the level proper. The upper end of the glass rod 4 extends so far up into the horizontally positioned tube as to almost contact with the air bubble, as shown in Fig. 2, and it is provided for the purpose of leading or conveying the bubble from the horizontal tube to the vertical extension, indicated at 3.

A spirit level glass constructed as here shown can be much more cheaply manufactured, as it is made in a single unit and can consequently be more cheaply assembled and more easily adjusted, when positioned in the stock of the level, as indicated in Fig. 1.

The tube 2 is provided with a center mark in the usual manner, and the vertical extension 3 has a similar mark 7 to show when the level is plumb. The level as a whole is otherwise used and applied in the usual manner.

I wish it understood that various changes in form, proportions and minor details of construction may be resorted to within the scope of the appended claim, and that I do not wish to limit myself to the specific design and construction here shown.

Having thus described my invention, what I claim and desire to secure by Letters Patent is—

A spirit level composed of a horizontal tube and a vertical tube formed integral therewith, a glass rod having one end rigidly secured to the outer end of the vertical tube and having its opposite end free and spaced from the outer portion of the horizontal tube at the center of the length of the latter, and fluid within the tubes, partially filling same so as to leave a bubble of air therein.

In testimony whereof I have hereunto set my hand in the presence of two subscribing witnesses.

RICHARD F. HOMMEL.

Witnesses:
JOHN RIEGER,
W. W. HEALEY.